United States Patent
Beyda

(10) Patent No.: US 7,206,384 B2
(45) Date of Patent: Apr. 17, 2007

(54) SYSTEM AND METHOD FOR AUTOMATING COMMUNICATIONS SYSTEM SOFTWARE UPGRADES

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 10/252,310

(22) Filed: Sep. 23, 2002

(65) Prior Publication Data

US 2004/0057558 A1 Mar. 25, 2004

(51) Int. Cl.
*H04M 1/24* (2006.01)
*H04M 3/08* (2006.01)
*H04M 3/22* (2006.01)

(52) U.S. Cl. ................... 379/9.01; 379/9; 379/15.01

(58) Field of Classification Search ............ 379/9, 379/9.01–9.04, 15.02, 32.01, 15.01, 230; 707/203, 511; 717/168, 170, 172, 173

See application file for complete search history.

(56) References Cited

U.S. PATENT DOCUMENTS

| | | | | |
|---|---|---|---|---|
| 5,682,533 A | * | 10/1997 | Siljestroemer | 707/200 |
| 6,012,130 A | * | 1/2000 | Beyda et al. | 711/173 |
| 6,393,101 B1 | * | 5/2002 | Barshefsky et al. | 379/9.04 |
| 6,396,904 B1 | * | 5/2002 | Lilley et al. | 379/9.04 |
| 6,477,703 B1 | * | 11/2002 | Smith et al. | 717/168 |
| 6,993,763 B2 | * | 1/2006 | Hayes, Jr. | 718/102 |
| 2003/0229890 A1 | * | 12/2003 | Lau et al. | 717/168 |
| 2003/0233644 A1 | * | 12/2003 | Cohen et al. | 717/171 |

* cited by examiner

*Primary Examiner*—Quoc Tran

(57) ABSTRACT

A telecommunications system includes a switch having a controller implementing software to control switching operation and a memory for storing a database of software upgrade risk factors. The software upgrade risk factors define whether a software upgrade is to be attended by an on-site technician or by a remote monitor. The system further allows for downloading to the switch a software upgrade for the controller if a software upgrade risk factor for that software upgrade has a predetermined value.

21 Claims, 4 Drawing Sheets

| A | ACCEPT UNATTENDED |
|---|---|
| B | ACCEPT WITH TECH ON SITE |
| C | ACCEPT WITH REMOTE ATTENDANT |
| D | WAIT |

SYSTEM AND METHOD FOR AUTOMATING COMMUNICATIONS SYSTEM SOFTWARE UPGRADES

FIELD OF THE INVENTION

The present invention relates to telecommunications systems and, in particular, to an improved system and method for upgrading telecommunications system software.

BACKGROUND OF THE INVENTION

In both the personal computing and telecommunications environments, software upgrades traditionally have been implemented by providing media such as disks, tapes, etc., which require someone on-site (either the user or a service technician) to handle the actual installation.

Increasingly, in the personal computing environment, software upgrades are being handled via Internet download and automatic or user-directed semi-automatic installation. In contrast, in traditional telecommunications systems, even when fast downloads are available, large enterprise customers are often reluctant to permit an unattended upgrade of equipment such as PBXs, gatekeepers, communications servers, messaging systems, call centers, or other telecommunications devices that might provide critical services or even have a health or safety impact (e.g., those associated with hospital or police systems). Downloading the upgrade and having it installed automatically is seen as too risky.

Consequently, typically, the upgrade media are transported physically, such as via a freight carrier, because it is usually less expensive (in terms of technician time) than downloading via the Internet or telephone lines. A service technician is then dispatched to perform the upgrade on-site (In other cases, the technician may bring the upgrade media himself.). In either case, the actual installation can be relatively expensive (e.g., a service technician's hourly rate can be in the neighborhood of $250/hr.). This is particularly the case when a subscription business model is used. In such a system, users pay an annual licensing fee and receive in return any necessary upgrades.

Therefore, there is a need for an improved system and method for performing telecommunication software upgrades. There is a further need for a more efficient and less expensive way of performing telecommunications system software upgrades.

SUMMARY OF THE INVENTION

These and other drawbacks in the prior art are overcome in large part by a system and method according to embodiments of the present invention.

A telecommunications system according to an embodiment of the present invention includes a switch having a controller implementing software to control switching operation and a memory for storing a database of software upgrade risk factors. The software upgrade risk factors define whether a software upgrade is to be attended by an on-site technician or by a remote monitor or to occur automatically. The system further allows for downloading to the switch a software upgrade for the controller if a software upgrade risk factor for that software upgrade has a predetermined value.

A telecommunications method according to an embodiment of the present invention includes determining an upgrade risk factor for a telecommunications system software upgrade; delivering the telecommunications system software upgrade based on the risk factor; and installing the telecommunications system software upgrade based on the risk factor. The method further includes maintaining a database of customer preferred upgrade risk factors, the risk factors defining a degree of attendance for a software upgrade.

A telecommunications device according to an embodiment of the present invention includes a database for storing one or more software upgrade risk factors for telecommunications systems and allows for downloading to controllers software upgrades based on the upgrade risk factors. The upgrade risk factors defining degrees of automation and in-person attendance for the upgrade.

Broadly speaking, embodiments of the present invention relate to an improved upgrade subscription system. A risk factor is placed on a software upgrade and the customers are notified of the upgrade's availability. The customer's risk tolerance is maintained in a database and the upgrade proceeds according to that tolerance. The upgrade may, for example, be downloaded and automatically installed; or downloaded and held for a later installation; or downloaded and installed with a remote monitoring; or installed by an on-site service technician. Further, in certain embodiments, the upgrade may be deferred until its risk factor falls below the customer's threshold. Finally, differential pricing or license fees may be effected based on the customer's risk tolerance and the method of upgrade.

A better understanding of these and other specific embodiments of the invention is obtained when the following detailed description is considered in conjunction with the following drawings.

DETAILED DESCRIPTION OF EMBODIMENTS OF THE INVENTION

Figure 1:
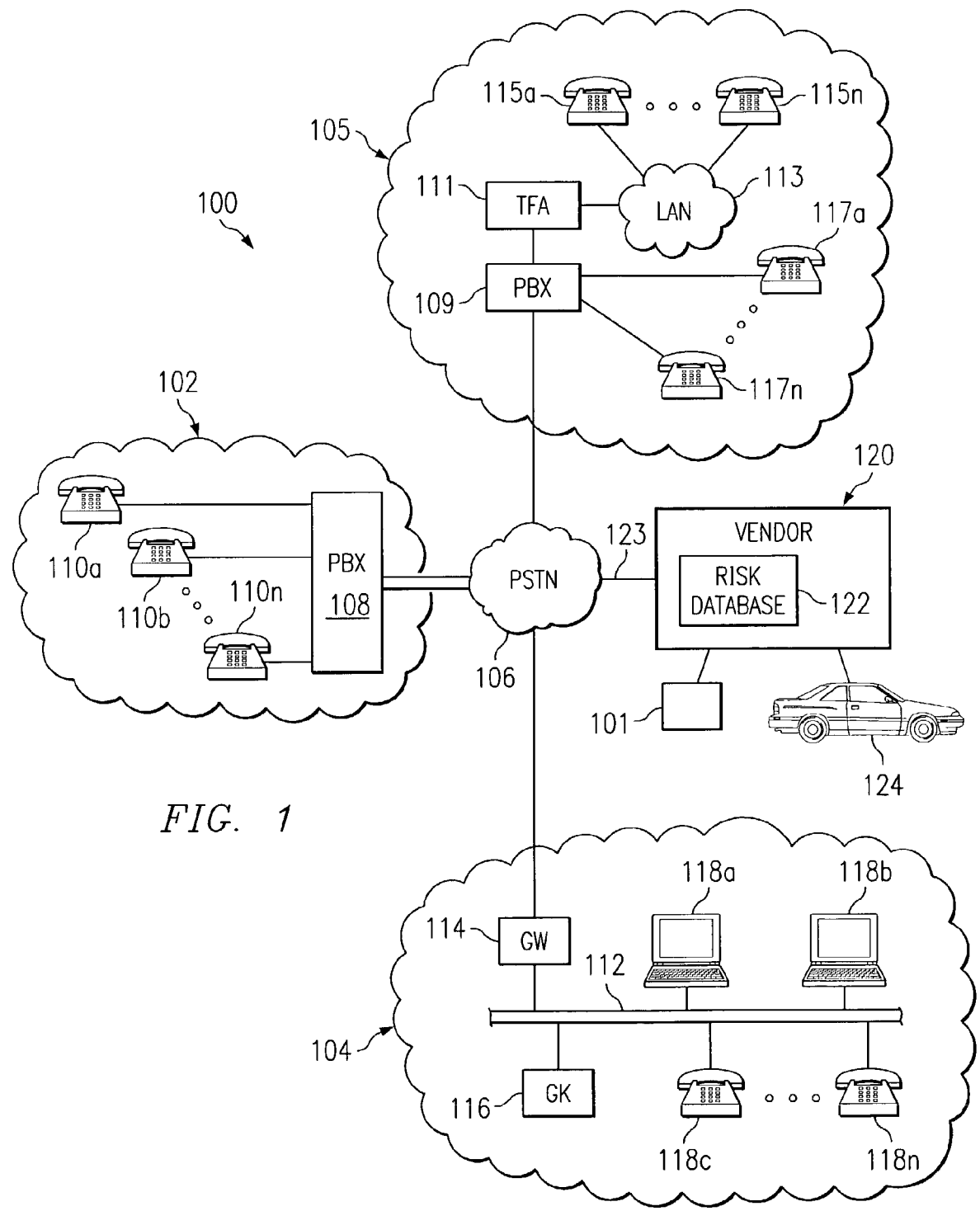
FIG. 1 is a diagram of a telecommunication system according to an embodiment of the present invention.

Turning now to the drawings and, with particular attention to FIG. 1, a diagram of a telecommunications system 100 according to an embodiment of the present invention is shown.

More particularly, FIG. 1 illustrates a telecommunications system including a plurality of networks 102, 104, 105 coupled to the Public Switched Telephone Network (PSTN) 106. The network 102 may be embodied as a private telephone network, employing a private branch exchange (PBX) 108 to interface to the PSTN 106. Coupled to the PBX 108 may be a plurality of system telephones 110a–110n, or other telephony devices. While the PBX 108 may be any of a variety of telecommunications switches or servers, an exemplary PBX 108 is the Hicom, available from Siemens Corp. Exemplary telephony devices include the Siemens Optiset telephones.

The network 104 may be a data LAN (local area network) or a LAN employing a multimedia or telephony-over-LAN technology, such as Recommendation H.323 or Session Initiation Protocol (SIP) although other packet multimedia protocols may be employed. In the embodiment illustrated, the network 104 is an H.323-based system. Thus, the network 104 includes a LAN 112, a gateway 114, a gatekeeper 116, and a plurality of telephony devices 118a–118n.

Also coupled to the PSTN 106 may be network 105. The network 105 includes a PBX 109 to which may be coupled a plurality of PBX telephony devices 117a–117n. The PBX 109 may be embodied as a Hicom PBX. Also coupled to the PBX 109 may be a telephony feature access server or device 111 which couples a LAN 113 to the PBX 109. Devices 115a–115n on the network 113 may be configured to obtain telephony services through the PBX 109 via the TFA 111. An exemplary telephony feature access server is the Hicom Feature Access server, available from Siemens Corp., and employing the Cornet protocol. In certain embodiments, the TFA 111 may be equipped with Instant Messaging, calendaring, and VoIP capabilities, either as a server or a network device, which may require updating according to embodiments of the present invention. It is noted that additional ToL network devices may be provided, such as multipoint control units and network servers.

It is noted that more or fewer networks may be provided. It is further noted that networks having differing configurations may be provided. For example, one or more of the networks may be wireless or cellular networks. Further, the public telephone network 106 may be embodied as a combination of linked analog and digital networks, as is known. For example, the public telephone network may be configured as an integrated services digital network (ISDN). Thus, the figures are exemplary only.

A variety of the network devices, such as the PBXs 108, 109, the TFA 111, gateway 114, and gatekeeper 116, as well as other servers and switches (not shown) may require periodic software upgrades. According to an embodiment of the present invention, a vendor upgrade service 120 may be coupled to communicate in the network. As will be described in greater detail below, the vendor upgrade service 120 may include a database 122 of upgrade risk factors for a particular software upgrade. The database 122 may also be used to store a customer profile of risk factors or tolerances, defining whether the upgrade 101 is to be downloaded 123 all or in part via the PSTN 106 or whether on-site delivery 124 and installation is required.

Figure 2:
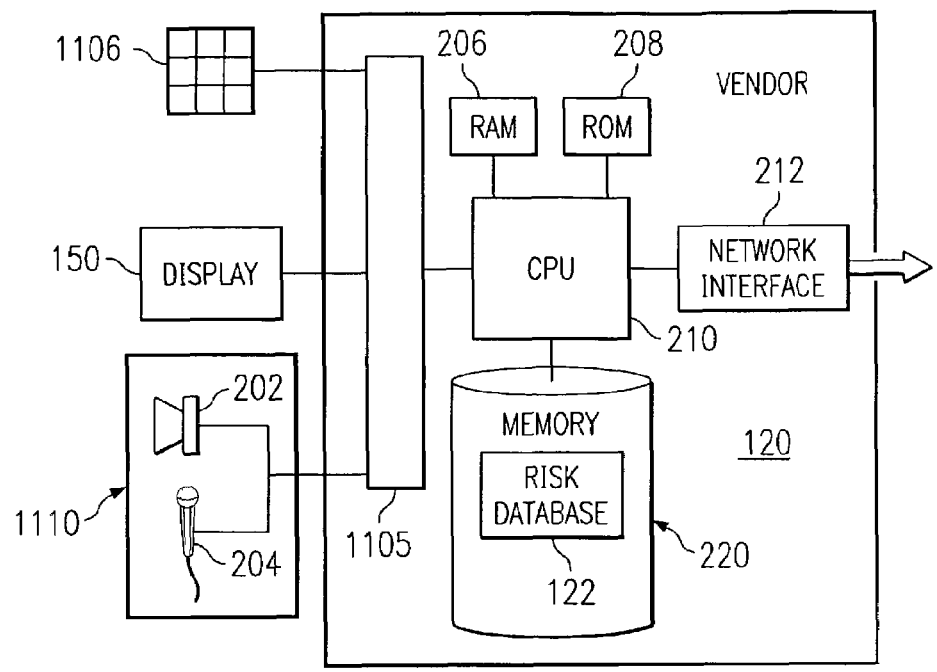
FIG. 2 is a block diagram of an exemplary vendor update system according to an embodiment of the present invention.

A block diagram of an exemplary vendor upgrade service 120 is shown in FIG. 2. The vendor upgrade service may be implemented as a server or personal computer and includes a central processing unit (CPU) 210 which is the primary controller for the vendor upgrade service. The CPU 210 may be embodied as a known microprocessor or microcontroller. The CPU 210 is coupled to random access memory (RAM) 206, read only memory (ROM) 208, and a mass storage device 220. As is know, the CPU 210 is configured to run programs stored in one or more of the RAM 208, ROM 206, or mass storage device 220. The CPU 210 is coupled to a network interface 212. The network interface is configured to interface the device to the public network. For example, the network interface 212 may be embodied as an ISDN network interface or terminal adapter. Thus, the vendor upgrade service 120 may be compliant with the International Telecommunications Union Standard Q.930/931, which is hereby incorporated by reference in its entirety as if fully set forth herein. The CPU 210 may be further coupled to an I/O interface 1105, which may provide an interface to a keypad 1106, display 150, and a handset 1110, including a speaker 202 and microphone 204. As will be discussed in greater detail below, the vendor upgrade service 120 is configured to store in the memory device 220 a database 122 of upgrade risk factors and customer preferences. In addition, the vendor service 120 may include one or more drive for removable media (not shown), such as magnetic or optical drives.

Figure 3:
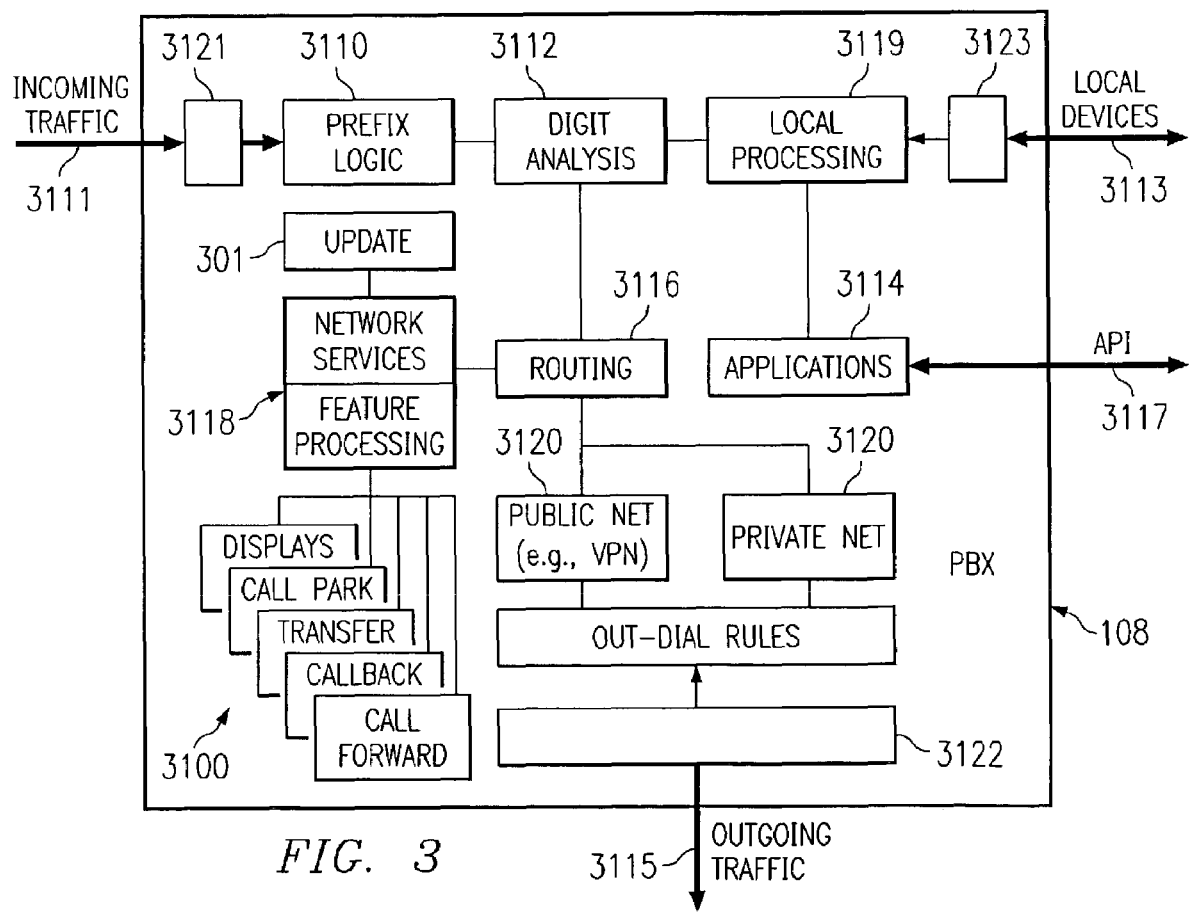
FIG. 3 is a block diagram of an exemplary telecommunications server according to an embodiment of the present invention.

A block diagram of an exemplary server or switch 108 which may require software updating according to an embodiment of the invention is shown in FIG. 3. In what follows, for sake of simplicity, the description will focus primarily on the PBX 108, it being understood that the teachings of the present invention are equally applicable to the PBX 109, TFA 111, and ToL devices such as the gateway 114 and gatekeeper 116.

The PBX 108 includes a network resource feature processing module 3118 and an update module 301 according to embodiments of the present invention. The update module 301 may interact to receive updates from the update service 120 (FIG. 1), and in certain embodiments, the update module 301 stores the local user's update preferences and risk tolerances, as will be described in greater detail below.

The feature processing module 3118 may be used to handle supplementary services 3100, such as displays, call park, call transfer, callback, and call forwarding. As noted above, the PBX 108 may be any known telecommunications server and include internal standard components such as prefix logic 3110 and digit analysis 3112 for receiving, decoding and evaluating number information, applications logic 3114 such as CTI, a local processing unit 3119 for providing user interface aspects of various supplementary services, and a routing unit 3116 for routing a call to its proper destination. External interfaces to the server may include an incoming trunk 3111, such as a primary rate interface (PRI) or Internet line, incoming local traffic 3113, such as a basic rate interface (BRI) and outgoing traffic 3115, such as interfaces for PRI, virtual public (VPN) and private networks, and the like. An API 3117 may be used to connect CTI devices (e.g., using TAPI) to the PBX 108. The outgoing traffic may be routed, among other methods, over ISDN, asynchronous transfer mode or Intra/Internet communication networks.

The incoming/outgoing traffic lines, such as the BRI 3113 and PRI 3111, interface to device/trunk handlers 3121–3123. The trunk handlers 3121–3123 interface the PBX 108 to the external interface 3111, 3113, 3115 which contain the signaling channels. In particular, the handlers 3121–3123 operate as translation devices.

As will be discussed in greater detail below, the PBX 108 may receive software upgrades, such as via the BRI 3113, or by receiving local physical media and installing through a removable media device, such as a magnetic or optical drive (not shown). The degree to which the upgrade is attended or supervised may be determined by assigning a software upgrade risk factor to a particular upgrade and accessing or storing a customer's risk tolerances. For example, turning now to FIG. 4, a table of exemplary risk factors and tolerances is shown. For example, risk factor A, B, C, and D may be provided. A risk factor A indicates that the upgrade can be accepted unattended. A risk factor of B indicates that an upgrade can be accepted, but only with an on-site service technician. A risk factor of C indicates that the upgrade can be accepted with a remote service technician available and attending. Finally, a risk factor if D indicates that the user is willing to wait until the risk lowers to a more acceptable level before a download, for example.

It is noted that numerical risk factors may be assigned, as well (or alternatively). For example, the risk factors may be assigned on a scale of 0 through 10. Then, the risk tolerance might be I) accept all upgrades in unattended fashion, regardless of risk; ii) accept all upgrades with a service technician present, regardless of risk; and iii) accept upgrades with a risk less than 5 unattended, but 5 and above require a service technician to be present. Another risk tolerance might be I) upgrade risk 0–5 may be accepted unattended, ii) upgrades risk factor 6–7 attended remotely; and iii) risk factors 8–10 require a service call. Another risk tolerance might be I) upgrade 0–5 unattended; ii) 6–10 upgrade denied until the risk drops to 5 before attending. The risk factor for a particular upgrade may change over time, for example, as more copies of the upgrade are installed. In this last case, a periodic reminder may be sent from the vendor. It is noted that these a exemplary risk policies and are not intended to be all-inclusive.

Figures 4, 5:
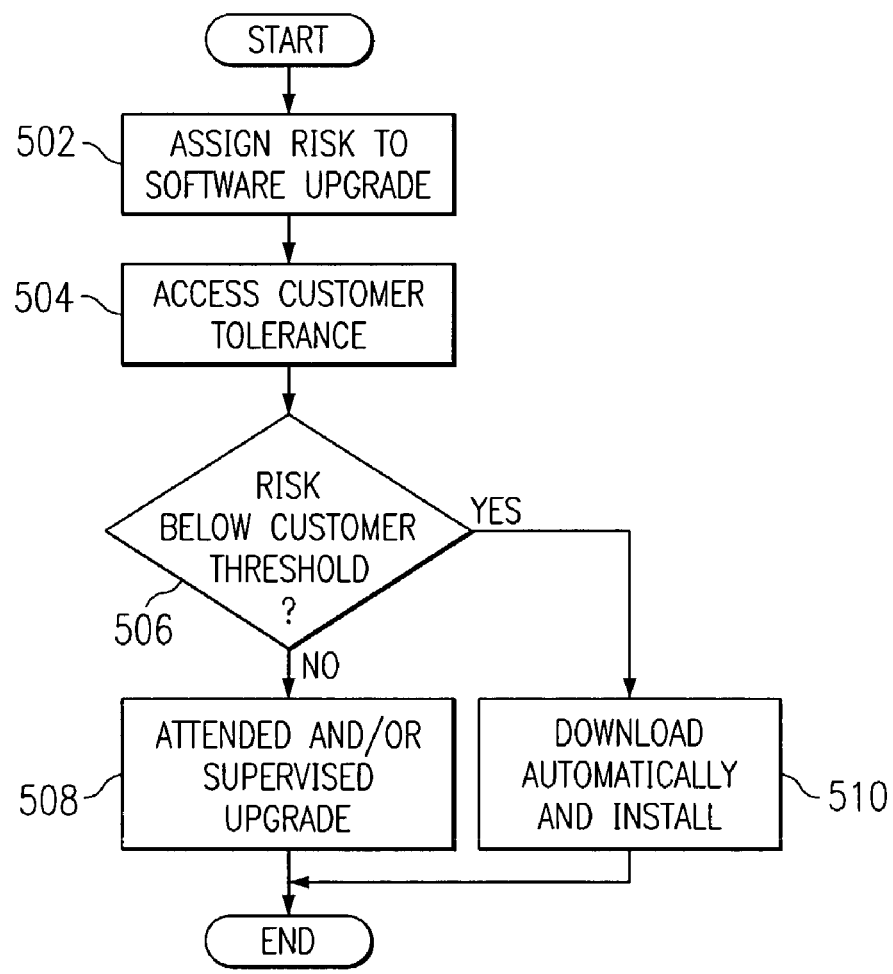
FIG. 4 is a diagram of an exemplary risk table according to an embodiment of the present invention.
FIG. 5 is a flowchart illustrating operation of an embodiment of the present invention.

Turning now to FIG. 5, a flowchart illustrating operation of an embodiment of the present invention is shown. At step 502, the vendor assigns risk factors to a software upgrade. The risk factors may be based on complexity or safety issues. The software upgrades themselves may be upgrades to essential or supplementary services. The risk factors may be stored at the database 122 of the vendor upgrade service 120. At step 504, the vendor upgrade service 120 accesses the customer's risk tolerances. The customer's risk tolerances may be stored in the local switch, such as at the upgrade module 301 of PBX 108 (FIG. 3), or may be stored at the vendor upgrade service 120. If the customer's risk tolerance is stored at the customer premises, the vendor upgrade service will send a request message to the customer for the desired information.

Once the risk tolerances have been accessed, the vendor upgrade service 120 determines, at step 506, whether the risk is below the customer threshold. If the risk is below a particular threshold, then in step 510, the upgrade may be downloaded and installed automatically. It the risk is above a threshold, then in step 508, the customer maybe notified and an on-site or remotely attended upgrade may be performed. It is noted that in either case, the upgrade may be downloaded and stored by the upgrade module 301 at a convenient time (e.g., when system bandwidth usage is less) for later installation. Further, a customer could be charged a differential licensing fee based on whether he is willing to take an installation automatically.

Figure 6:
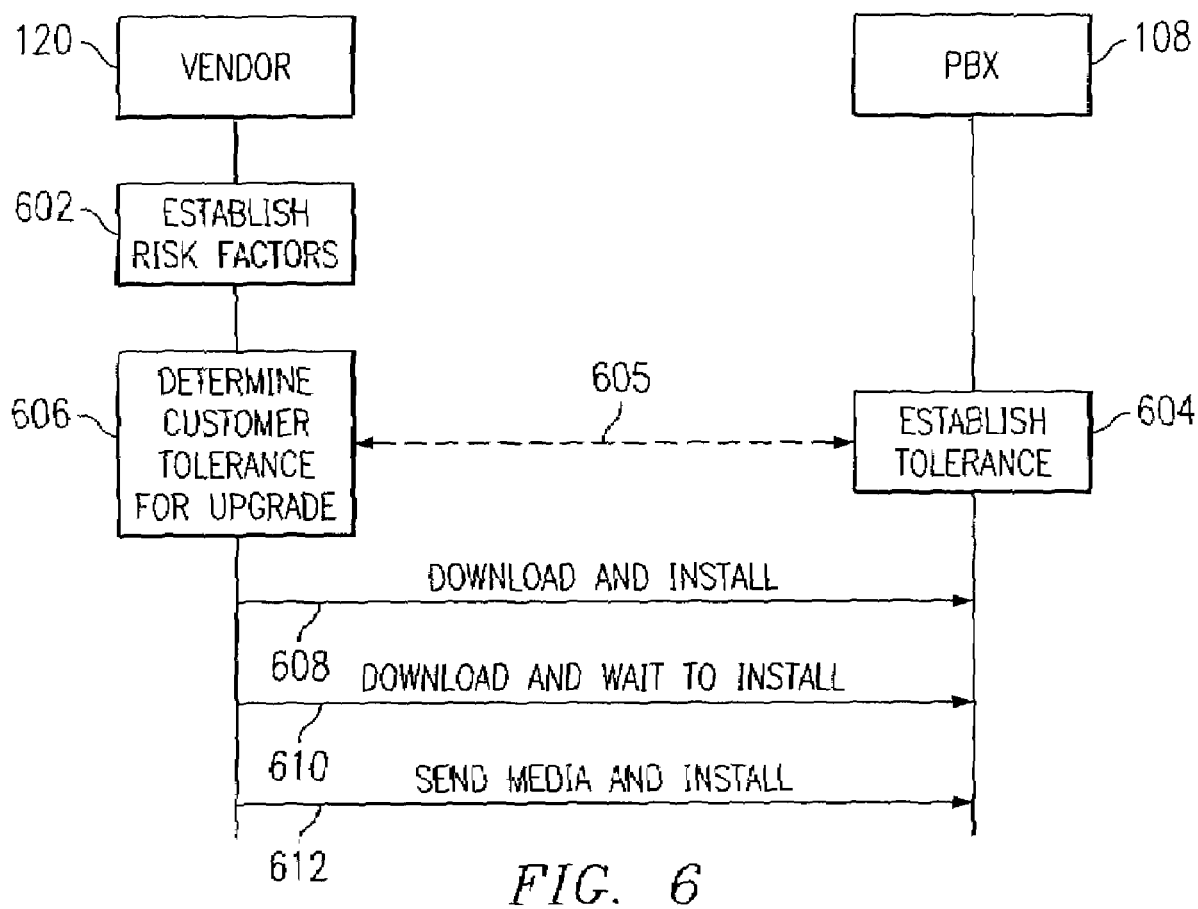
FIG. 6 is a diagram illustrating operation of an embodiment of the present invention.

Turning now to FIG. 6, a signaling diagram illustrating operation of an embodiment of the present invention is shown. In particular, shown are the vendor update service and a telecommunications switch, such as PBX 108. At 602, the vendor update service 120 establishes a bas set of risk factors for software upgrades in general and the particular software upgrade of immediate concern, as well. At 604, the PBX 108 update module 301 establishes a set of tolerances for the PBX. As noted above, this can be based on how long an update will take, or its relative complexity. At 606, the vendor upgrade service 120 establishes the customer's tolerance for the particular upgrade. This may include requesting this information from the PBX 108 and receiving a message from the customer indicating the customer's tolerance for the particular upgrade, at 605. Alternatively, the vendor update service 120 may already have stored the customer's preference and may merely need to access this information from the database 122. Then, the vendor update service 120 will either download and install the upgrade, at 608, or will download and wait to install, at 610; or will dispatch a media package via a freight service and thereafter install it, at 612.

Figure 7:
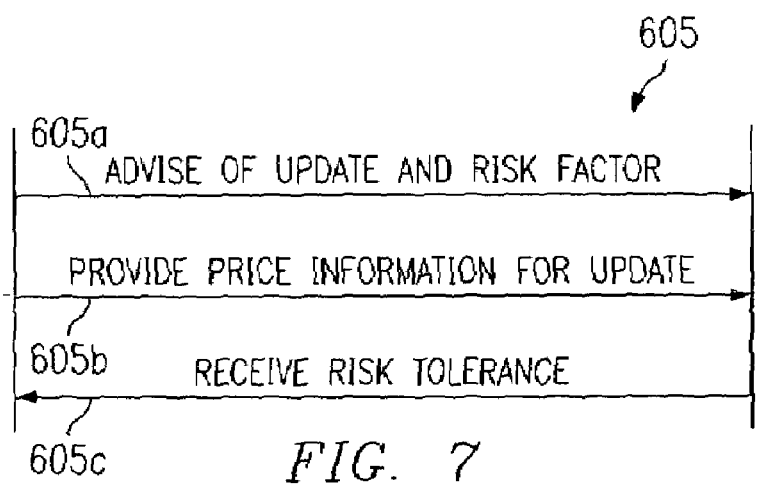
FIG. 7 is a diagram illustrating operation of an embodiment of the present invention.

As noted above, one method for determining the customer's upgrade risk tolerance is through a signaling between the vendor upgrade service 120 and the customer at 605. The customer's risk tolerance can be determined or adjusted on an upgrade-by-upgrade basis, for example, based on cost or other factors. FIG. 7 illustrates one method for doing so. In particular, at 605a, the vendor upgrade service 120 advises the customer 108 of an update, and also of the risk factor that has been assigned to the particular upgrade. At 605b, the vendor upgrade service 120 may also provide price information for the upgrade and the available upgrade options. The customer can then make a determination, based on both risk factors and pricing information, of how or whether the upgrade should proceed. Finally, at 605c, the customer sends the risk tolerance for the upgrade to the vendor upgrade service 120. The actual upgrade can then proceed, as described above.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, comprising:
    a switch having a controller implementing software to control switching operation;
    a memory for storing a database of customer profiles of user risk tolerances associated with software upgrade risk factors; and
    a memory for storing a database of software upgrade risk factors, said software upgrade risk factors and risk tolerances defining whether a software upgrade is to be downloaded all or in part or attended in person or remotely and based on a complexity or safety-related issue associated with said software upgrade;
    wherein user risk tolerances are set by individual customers of particular software and said software upgrade risk factors are set by a vendor of the particular software.

2. A telecommunications system in accordance with claim 1, further comprising means for downloading to said switch a software upgrade for said controller if a software upgrade risk factor for that software upgrade has a predetermined value.

3. A telecommunications system in accordance with claim 1, further comprising means for notifying said switch of a type and schedule of a software upgrade.

4. A telecommunications system in accordance with claim 3, further comprising means for downloading and installing to said switch said software upgrade.

5. A telecommunications method, comprising:
    determining an upgrade risk factor and customer risk tolerance for a telecommunications system software upgrade, said upgrade risk factor being based on a complexity or safety issue associated with said telecommunications system software upgrade;
    downloading said telecommunications system software upgrade based on said risk factor and customer risk tolerance; and
    installing said telecommunications system software upgrade based on said risk factor and risk tolerance;

wherein user risk tolerances are set by individual customers of particular software and said software upgrade risk factors are set by a vendor of the particular software.

6. A telecommunications method in accordance with claim 5, further comprising maintaining a database of customer preferred upgrade risk factors.

7. A telecommunications method in accordance with claim 6, said maintaining a database further comprising maintaining a preferred upgrade schedule.

8. A telecommunications method in accordance with claim 7, said upgrade risk factor defining a degree of automation and in-person attendance for said upgrade.

9. A method in accordance with claim 8, wherein said installing further comprises charging a different fee for said installing based on said risk factor.

10. A telecommunications method, comprising:
providing a switch having a controller implementing software to control switching operation; and
providing a memory for storing a database of software upgrade risk factors, said software upgrade risk factors including a customer risk tolerance and defining whether a software upgrade is to be attended and based on a complexity or safety-related issue associated with said software upgrade;
wherein customer risk tolerances are set by individual customers of particular software and said software upgrade risk factors are set by a vendor of the particular software.

11. A telecommunications method in accordance with claim 10, further comprising providing a means for downloading to said switch a software upgrade for said controller if a software upgrade risk factor for that software upgrade has a predetermined value.

12. A telecommunications method in accordance with claim 11, further comprising providing a means for notifying said switch of a type and schedule of a software upgrade.

13. A telecommunications method in accordance with claim 12, further comprising providing a means for downloading and installing to said switch said software upgrade.

14. A telecommunications device, comprising:
a database for storing one or more software upgrade risk factors for telecommunications systems, said software upgrade risk factors being based on a complexity or safety issue associated with a telecommunications system software upgrade and including a customer risk tolerance; and
means for downloading to controllers for said telecommunications systems software upgrades based on said upgrade risk factors;
wherein user risk tolerances are set by individual customers of particular software and said software upgrade risk factors are set by a vendor of the particular software.

15. A telecommunications device in accordance with claim 14, said upgrade risk factors defining degrees of automation and in-person attendance for said upgrade.

16. A telecommunications device in accordance with claim 15, said database further storing a schedule of when software upgrades are to occur based on said upgrade risk factors.

17. A telecommunications device in accordance with claim 16, said database further storing a differential pricing schedule based on said degrees of automation and in-person attendance.

18. A telecommunications method comprising:
downloading a software upgrade to a telecommunications switch based on an upgrade risk factor, said upgrade risk factor being based on a complexity or safety issue associated with said software upgrade and including a customer risk tolerance; and
installing said software upgrade at a later time based on said upgrade risk factor;
wherein said software upgrade is installed automatically or with in-person attendance based on said upgrade risk factor;
wherein user risk tolerances are set by individual customers of particular software and said software upgrade risk factors are set by a vendor of the particular software.

19. A telecommunications system, comprising:
a switch having a controller implementing software to control switching operation;
a memory for storing a database of software upgrade risk factors and customer preferences of risk tolerances, said software upgrade risk factors and customer preferences defining whether a software upgrade is to be attended or occur automatically, said upgrade risk factor being based on a complexity or safety issue associated with said software upgrade;
wherein customer preferences are set by individual customers of particular software end said software upgrade risk factors are set by a vendor of the particular software.

20. A telecommunications system, comprising:
a switch having a controller implementing software to control switching operation;
a memory for storing a database of software upgrade risk factors, said software upgrade risk factors including customer risk tolerances and defining whether a software upgrade is to be attended and based on a length of time an upgrade will take;
wherein customer risk tolerances are set by individual customers of particular software and said software upgrade risk factors are set by a vendor of the particular software.

21. A telecommunications method, comprising:
determining an upgrade risk factor for a telecommunications system software upgrade, said upgrade risk factor being based on a complexity or safety issue associated with said telecommunications system software upgrade;
charging a software customer a differential price based on the risk factor; and
downloading said telecommunications system software upgrade based on said risk factor or installing said telecommunications system software upgrade in person based on said risk factor;
wherein a user risk tolerance defining whether an upgrade is to be downloaded or installed in person is set by individual customers of particular software and said software upgrade risk factors are set by a vendor of the particular software.

* * * * *